No. 865,731. PATENTED SEPT. 10, 1907.
E. W. VALENTA.
LIQUID WEIGHING APPARATUS.
APPLICATION FILED APR. 22, 1907.
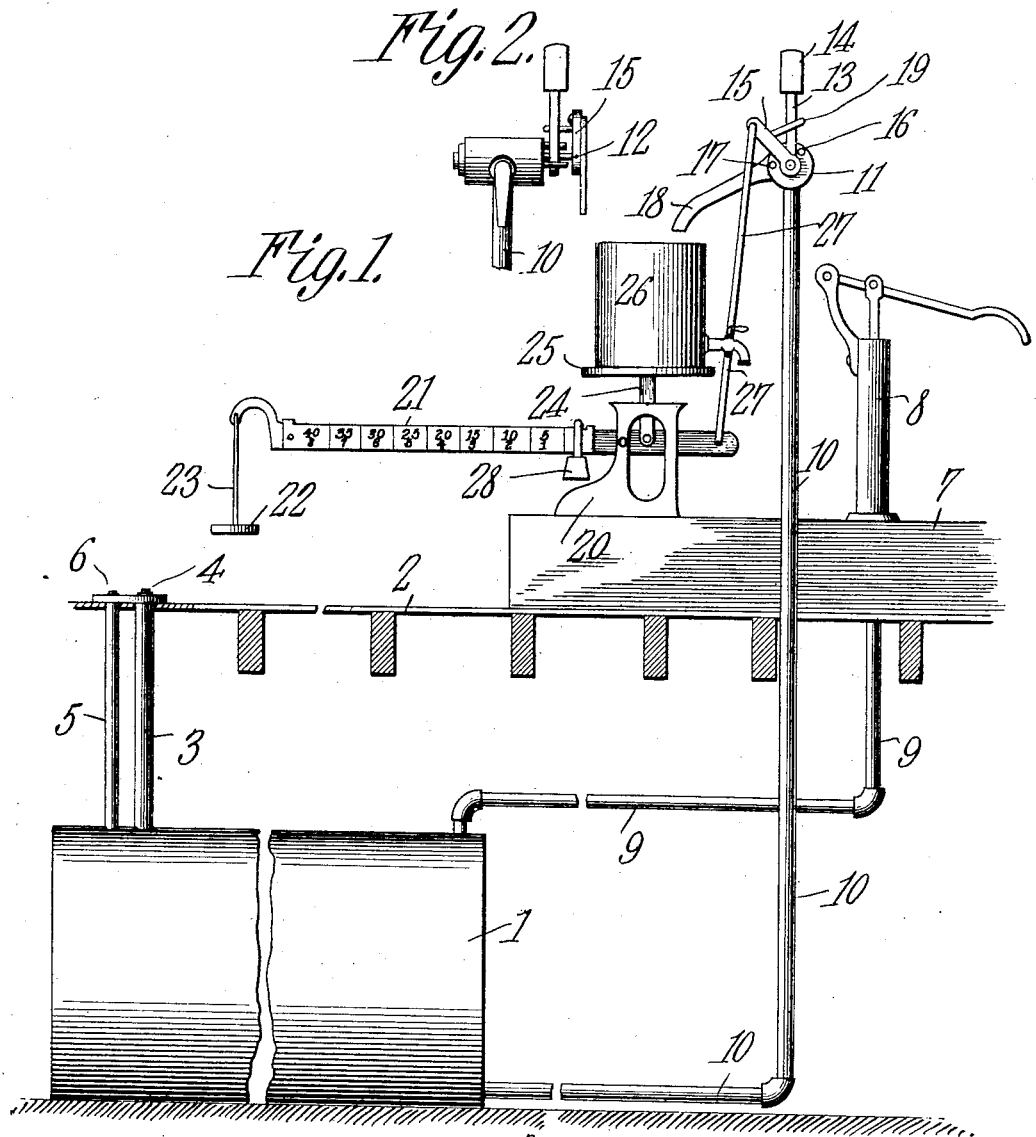
WITNESSES:
Edward W. Valenta
INVENTOR.
By C. A. Snow & Co.
ATTORNEYS

UNITED STATES PATENT OFFICE.

EDWARD W. VALENTA, OF CEDAR RAPIDS, IOWA, ASSIGNOR OF ONE-HALF TO WESLEY A. VALENTA, OF CEDAR RAPIDS, IOWA.

LIQUID-WEIGHING APPARATUS.

No. 865,731.      Specification of Letters Patent.      Patented Sept. 10, 1907.

Application filed April 22, 1907. Serial No. 369,587.

*To all whom it may concern:*

Be it known that I, EDWARD W. VALENTA, a citizen of the United States, residing at Cedar Rapids, in the county of Linn and State of Iowa, have invented a new and useful Liquid-Weighing Apparatus, of which the following is a specification.

This invention has reference to improvements in liquid weighing apparatus, such as oil, gasolene and the like, which self-measuring devices may be provided with price-computing parts.

The object of the invention is to provide a means whereby the liquid to be measured is permitted to flow into a vessel until its weight overbalances a counterweight so adjustable as to cause the overbalancing of the counterweight by the liquid-receiving vessel when a certain predetermined quantity of liquid has flowed into said vessel, and means are provided, under the control of the parts supporting the liquid-receiving vessel, so that when the latter is caused to move on receiving the predetermined quantity of liquid a valve in the supply pipe is quickly closed. This closure of the valve is, after the valve has been started toward the closed position, no longer under the control of the parts carrying the liquid-receiving vessel, so that the closure of the valve may be so quickly accomplished as to be practically instantaneous.

In the practical embodiment of the invention, the liquid to be measured is under the control of an overbalanced valve so arranged as to remain in the open position under a force slightly overbalancing it in the proper direction, but which valve, when moved through a small portion of its range of travel toward the closed position, will come under the influence of the overbalancing means and be moved the remainder of the distance toward the closed position irrespective of the initial impulse which started it toward the closed position. A suitable scale beam is provided and this scale beam is so mounted as to receive a liquid-container to which the liquid coming through the valve may be directed through a suitable spout. The scale beam is connected to the valve-operating means in such manner that when the valve is open a small movement of the scale beam toward the overbalanced position will give the initial movement to the valve necessary to cause it to move toward the closed position. The scale beam is provided with a suitable index which may be provided with indications to show the position of a suitable weight in order that the scale beam may not be overbalanced until the determined quantity of liquid has been directed into the container. The index on the scale beam may also provide price indications so that the user of the device will not be compelled to make any computations.

The invention will be fully understood from the following detailed description taken in connection with the accompanying drawings forming part of this specification, in which,—

Figure 1 shows a side elevation, partly in section and partly schematic, of the improved liquid weighing and computing device; Fig. 2 is a detail view of the valve mechanism; and Fig. 3 is a detail view of a form of index device to be applied to the scale beam.

Referring to the drawings, there is shown a tank 1 for the liquid which, in the present instance, is supposed to be located below the main floor 2 of the room or compartment containing the measuring means. The tank 1 may be provided with a filling pipe 3 extending through the floor 2 and there provided with a closing plug 4, and likewise this tank may have a vent pipe 5 extending through the floor 2 and there provided with a closing plug 6. At an appropriate point above the floor 2, say upon a platform 7, there is located an air pump 8 which may be of any ordinary or approved construction. This air pump is connected by a pipe 9 to the upper side of the tank 1, and from the lower side of the tank 1 there leads another pipe 10 extending upward through the floor 2 and terminating at its upper end in a horizontal valve casing 11 containing a suitable valve of the rotary type. This valve is provided with a stem 12 extending out from one side of the casing 11 and there carrying an arm 13 extending radially from the valve stem with relation to the axis thereof and terminating at the upper end in an enlargement or weight 14. The valve stem 12 also carries a rock arm 15, the function of which will be hereinafter referred to. In the path of the arm 13 the valve casing 11 carries two spaced pins 16 and 17, the pin 16 being so located that the arm 13 will rest against the same in a position slightly to one side of the vertical, in which position the valve is open to the pipe 10 and to a suitable spout 18 leading from the valve casing 11. When the arm 13 is in engagement with the pin 17 the valve will be closed to the pipe 10 and spout 18. The arm 15 before referred to is provided with a hook-shaped finger 19 so arranged as to engage behind the arm 13, and the before-mentioned arm 15 is loose upon the valve stem 12 so as to turn independently thereof.

Mounted upon the platform 7 is the standard 20 of suitable balance scales. Mounted in this standard 20 in the usual manner is a balance scale beam 21 carrying at its outer end a pendent, weight-receiving support 22 by means of a link 23, as is customary. Close to the fulcrum point of the scale beam 21 the latter carries the usual support 24 terminating in a platform 25 for the reception of a vessel 26 designed to receive liquid from the spout 18, the parts being so arranged that when the container 26 is on the platform 25 it will be just under the mouth of the spout 18.

The scale beam is extended beyond its fulcrum point to a sufficient distance to clear the platform 25 and is there connected by a rod 27 to the free end of the arm 15 before mentioned.

On the scale beam there is mounted the usual sliding, adjustable weight 28, and other weights may be placed upon the receiver 22, as may be desired.

Two indexes are provided for each side of the scale beam, one for gallons and fractional parts thereof such as quarts and pints, and the other for price indications. Now, since the prices may be changed from time to time, it is advisable to make the index-carrying parts separate from the scale beam, and for this reason such index is made as shown in Fig. 3, where one member 29 may represent both the quantity and price indications and another member 30 may also represent both the price and quantity indications, while these two parts are connected at their ends by integral connecting strips 31 which may be so bent that the two members 29 and 30 will lie parallel to each other so as to grasp the sides of the scale beam 21 with the connecting portions 31 straddling the said scale beam. The double indications may therefore be read from each side of the scale beam.

Now, let it be supposed that the tank 1 contains liquid and that the plugs 4 and 6 are in place in the pipes 3 and 5 respectively. The operator places the container 26 upon the platform 25 which, in the present instance, will cause the balance of the scale beam 21 when the weight 28 is at the zero point. The weight 28 is placed along the scale beam at the point which, according to the index, shows the position of the weight for the quantity of liquid it is desired to force into the container 26. The valve is opened by the manipulation of the weighted arm 13 so that the said arm engages the pin 16 and the pump 8 is operated so as to force air into the tank 1 which will cause the liquid in the tank to rise in the pipe 10 and pass through the valve and spout 18 into the container 26. Instead of first opening the valve and then operating the air pump, the latter may be operated before the valve is opened and then when the said valve is opened the liquid will be forced up through the pipe 10 by the pressure in the tank and out through the spout 18. When the weight of the liquid in the container 26 begins to overbalance the weight 28 the arm 15 is moved in a direction to cause the finger 19 to pull the arm 13 away from the pin 16 to and by the vertical plane cutting the axis of the valve within the valve casing 11. This movement continues but a short time before the weight 14 has passed such vertical plane, when it immediately gravitates in a direction to close the valve until arrested by the engagement of the arm 13 with the pin 17. This action is, of course, rapid and takes place much sooner than would occur if the movement of the scale beam were depended upon to cause the entire movement of the valve from the open to the closed position. For this reason the liquid may be very accurately measured, for in devices where the valve is slowly closed there is always danger of permitting too great a flow of liquid after the scale beam has begun to move.

I claim:—

1. In a liquid weighing apparatus, means for weighing the liquid, a valve controlling the flow of liquid through the weighing apparatus, and a dead-point valve-operating mechanism comprising a weighted arm movable manually past the dead-point in one direction to open and maintain the valve in the opened position and movable automatically past the dead-point in the other direction to carry the valve to the closed position.

2. In a liquid weighing apparatus, a valve, a weighted arm connected thereto, spaced stops in the path of said arm, one adjacent to the vertical plane of said arm to hold the latter in a position close to the point of dead-center and another remote from said vertical plane and corresponding to the closed position of the valve, an arm loose on the valve stem and having a finger engaging behind the weighted arm when the latter is in the position corresponding to the open position of the valve, and means for moving the loose arm to an extent sufficient to carry the weighted arm past the dead-center.

In testimony that I claim the foregoing as my own, I have hereto affixed my signature in the presence of two witnesses.

EDWARD W. VALENTA.

Witnesses:
C. C. UPTON,
W. A. VALENTA.